United States Patent
Choi

(10) Patent No.: US 6,293,613 B1
(45) Date of Patent: Sep. 25, 2001

(54) AIR SPOILER FOR AUTOMOTIVE VEHICLE AND METHOD FOR MANUFACTURING THE SAME

(75) Inventor: Young Kwan Choi, Kyungsangbuk-do (KR)

(73) Assignee: Moya Plastics Co., Ltd., Kyungsangbuk-do (KR)

( * ) Notice: Subject to any disclaimer, the term of this patent is extended or adjusted under 35 U.S.C. 154(b) by 0 days.

(21) Appl. No.: 09/356,873

(22) Filed: Jul. 19, 1999

(30) Foreign Application Priority Data

Apr. 7, 1999 (KR) .................................................. 99-12003

(51) Int. Cl.⁷ .................................................. B62D 37/02
(52) U.S. Cl. .................................. 296/180.1; 296/180.2; 180/903
(58) Field of Search .............................. 296/180.1, 180.2, 296/180.4; 180/903; 244/130

(56) References Cited

U.S. PATENT DOCUMENTS

| 4,153,288 | * | 5/1979 | Mueller | 296/180.1 |
| 5,013,081 | * | 5/1991 | Cronce et al. | 296/180.1 |
| 5,106,147 | * | 4/1992 | Okada et al. | 296/180.1 |
| 5,435,617 | * | 7/1995 | Stanesic | 296/180.1 |
| 5,918,929 | * | 7/1999 | Vagis | 296/180.1 X |
| 6,012,762 | * | 1/2000 | Burg | 296/180.1 |

* cited by examiner

*Primary Examiner*—D. Glenn Dayoan
*Assistant Examiner*—Lori L. Coletta
(74) *Attorney, Agent, or Firm*—Lilling & Lilling P.C.

(57) ABSTRACT

An air spoiler for an automotive vehicle includes separate reinforcement members having a main body portion and a flange portion outwardly expanded from the main body. Preferably, a plurality of air-venting apertures are formed at the bottom surface of the main body portion of the reinforcement members so as to discharge air remaining in the reinforcement members. Further, the air spoiler includes an engagement reinforcing member which increases resin-engaged force of the reinforcement member to the air spoiler. An adhesive tape or a plastic primer is employed as the engagement reinforcing member.

6 Claims, 8 Drawing Sheets

US 6,293,613 B1

AIR SPOILER FOR AUTOMOTIVE VEHICLE AND METHOD FOR MANUFACTURING THE SAME

BACKGROUND OF THE INVENTION

1. Field of the Invention

The present invention relates to an air spoiler for an automotive vehicle, on which proper reinforcement members are molded integrally so as to increase attachment force of the air spoiler onto rear side surface of trunk lid of the automotive vehicle. Also, the present invention relates to a method for manufacturing an air spoiler for an automotive vehicle by air-blowing, where proper reinforcement members are molded integrally when air-blow molding the air spoiler.

2. Discussion of Related Art

As is well known, many kinds of air spoilers designed in harmony with specific exterior of automotive vehicle have been developed and widely used. The primary function of the air spoiler intended is for suppressing the automotive vehicle, being floating due to strong air current formed while running at high speed, toward road surface so as to increase driving stability and braking force of the automotive vehicle.

Referring to FIGS. 1 and 2, a typical air spoiler denoted by reference numeral 10 is disposed across the rear side, that is, trunk lid 14 of a vehicle 12. Conventionally, a plurality of attachment members 16, each having at least one securement screw 16a such as a T-bolt, are provided at the bottom surface of the air spoiler 10. The attachment members 16 serve to space the air spoiler 10 from the upper surface of the trunk lid 14 by a predetermined interval. The respective securement screws 16a for fitting the air spoiler 10 on the trunk lid 14 of the vehicle 12, are buried integrally in the corresponding attachment member 16 in the process of molding the air spoiler 10. Here, according to an exemplary process for manufacturing the prior art air spoiler, raw material, for example, thermoplastic resin from a source tank is passed through a rotary feeding screw via a hopper of the spoiler molding machine. At this time, the raw material is heated to be melted. Then, the melted raw material is passed through a head of the spoiler molding machine to be changed in cylindrical shape and supplied, in turn, between a core mold and a cavity mold which are open at present.

Referring now to FIG. 2, while the core mold is designed to form an upper part of the air spoiler 10, the cavity mold is to form a lower part including the attachment member 16 of the air spoiler 10, centering around a mold mating surface 18.

Consequently, when the cylindrical raw material has been supplied into the core and cavity molds via the head of the spoiler molding machine, the core and cavity molds are tightly closed. Then, an air cylinder of the spoiler molding machine moves forward and a plurality of blow pins of the spoiler molding machine form a plurality of air-blowing holes on the surface of the raw material supplied into the core and cavity molds in order to blow air through the air-blowing holes of the raw material for a predetermined period.

When the air blowing is completed, the air cylinder of the spoiler molding machine moves backward to its original position. Then, the core and cavity molds open slowly and a molded product, that is, a molded product of air spoiler is taken out by means of a product taking-out machine. The molded air spoiler is subjected to remove undesirable refuses, such as burr. Subsequently, an end-product, a desired air spoiler including attachment members formed integrally is obtained.

In such a conventional process for manufacturing the air spoiler, the respective attachment member 16 have the securement screws 16a such as a T-bolt buried integrally at the bottom surface of the air spoiler 10 so as to attach the air spoiler 10 onto the trunk lid 14 of the automotive vehicle 12.

When the raw material of the air spoiler is subjected to an air blowing stage, where the core mold is tightly closed with the cavity mold, in order to manufacture the aforementioned structure of the air spoiler 10, the raw material for molding the air spoiler 10 must be uniformly injected into the area where the attachment members 16 are to be formed on the cavity mold along the depth direction of the attachment members 16. However, in fact, during air-blowing process the raw material for molding the air spoiler 10 is injected irregularly into the attachment members 16 to be formed on the cavity mold. That is, undesirably, the raw material for molding the air spoiler 10 is gradually thinly injected into the area where the attachment members 16 are to be formed on the cavity mold as seen from a symmetric sectional view of FIG. 2.

If the thickness of the attachment members 16 is irregularly molded, durability of the area where the securement screws 16a are buried on the attachment members 16 is disadvantageously deteriorated. Accordingly, when the air spoiler 10 having the weakened area on the attachment member 16 is mounted on the surface of the trunk lid 14 of the automotive vehicle 12, the area of the attachment members 16 where the securement screws 16a are buried may be damaged or destroyed unexpectedly. Further, when the poor quality air spoiler 10 having the weakened attachment members 16 is mounted on the trunk lid 14 of the automotive vehicle 12, the stability of the automotive vehicle 12 is also deteriorated undesirably during running at high speed. Besides, it brings restriction on designing the molding process of the air spoiler 10.

SUMMARY OF THE INVENTION

Accordingly, an object of the present invention is to provide of an air spoiler for an automotive vehicle, on which separate reinforcement members are integrally molded around the area where the air spoiler is mounted onto the rear side surface of the automotive vehicle so as to assure the sufficient durability of the air spoiler when being mounted to the automotive vehicle.

Another object of the present invention is to provide a method for manufacturing an air spoiler for an automotive vehicle by disposing separate reinforcement members within an air spoiler forming mold, a cavity mold for example and injecting raw material such as thermoplastic resin into the reinforcement members.

In order to achieve the above object, according to an aspect of a preferred embodiment of the present invention, an air spoiler to be fitted on the upper surface of the trunk lid of an automotive vehicle includes a plurality of separate reinforcement members, being disposed around the area where the air spoiler is attached onto the trunk lid of the automotive vehicle, and formed integrally together with the raw material injected to be an end-product.

Advantageously, each of the reinforcement members has an elliptical main body part and a trumpet-shaped flange part outwardly enlarged from the main body part. And, at least a securement means is buried on the bottom surface of the main body part of the corresponding reinforcement member.

Besides, an engagement portion is formed at the periphery of the flange part of the reinforcement member.

According to the present invention, proper engagement reinforcing means for enhancing the engagement force of the reinforcement member to the raw material for forming the air spoiler is further provided inside the main body part of the reinforcement member. Here, preferably, an adhesive tape is employed as the engagement reinforcing means to be adhered in ring-shaped on the inside wall surface of the main body part of the reinforcement member. Alternatively, proper plastic primer may be employed to be injected into the main body part of the reinforcement member.

According to another aspect of the present invention, there is provided a method for manufacturing an air spoiler for an automotive vehicle, comprising a step of positioning a plurality of separate reinforcement members onto the positions of the cavity mold corresponding to the area where the air spoiler is fitted on the trunk lid of the automotive vehicle; a step of injecting the raw material for manufacturing the air spoiler to the inside of the reinforcement member under the discharge of air remaining in the reinforcement member, and performing air-blowing process for air-blowing the raw material into the core and cavity molds mutually closed so as to form a first stage product of the air spoiler; and, a step of performing surface finishing process for the product of the air spoiler so as to obtain an end-product of the air spoiler.

Preferably, at the step of air-blowing the raw material of the air spoiler, an engagement portion of the reinforcement member is integrally molded with the raw material of the air spoiler, and the step of discharging air remaining in the reinforcement member is executed through air-venting apertures formed at the bottom surface of the reinforcement member. And at the step of air-blowing, the raw material is injected to integrally mold the flange portion of the reinforcement member and the air spoiler.

According to the present invention, an engagement reinforcing member is provided so as to assure the engagement force enhanced between the inside of the reinforcement member and the raw material of the air spoiler.

Moreover, the engagement reinforcing member is an adhesive tape which is adhered in ring-shape on the inside wall surface of the main body portion of the reinforcement member. Alternatively, the engagement reinforcing member is a predetermined plastic primer which is injected to the inside of the main body portion of the reinforcement member.

The above objects and features of the present invention will become manifest to those skilled in the art from the following detailed description of the invention with reference to the drawings.

BRIEF DESCRIPTION OF THE ATTACHED DRAWINGS

DETAILED DESCRIPTION OF PREFERRED EMBODIMENT

Figure 1:
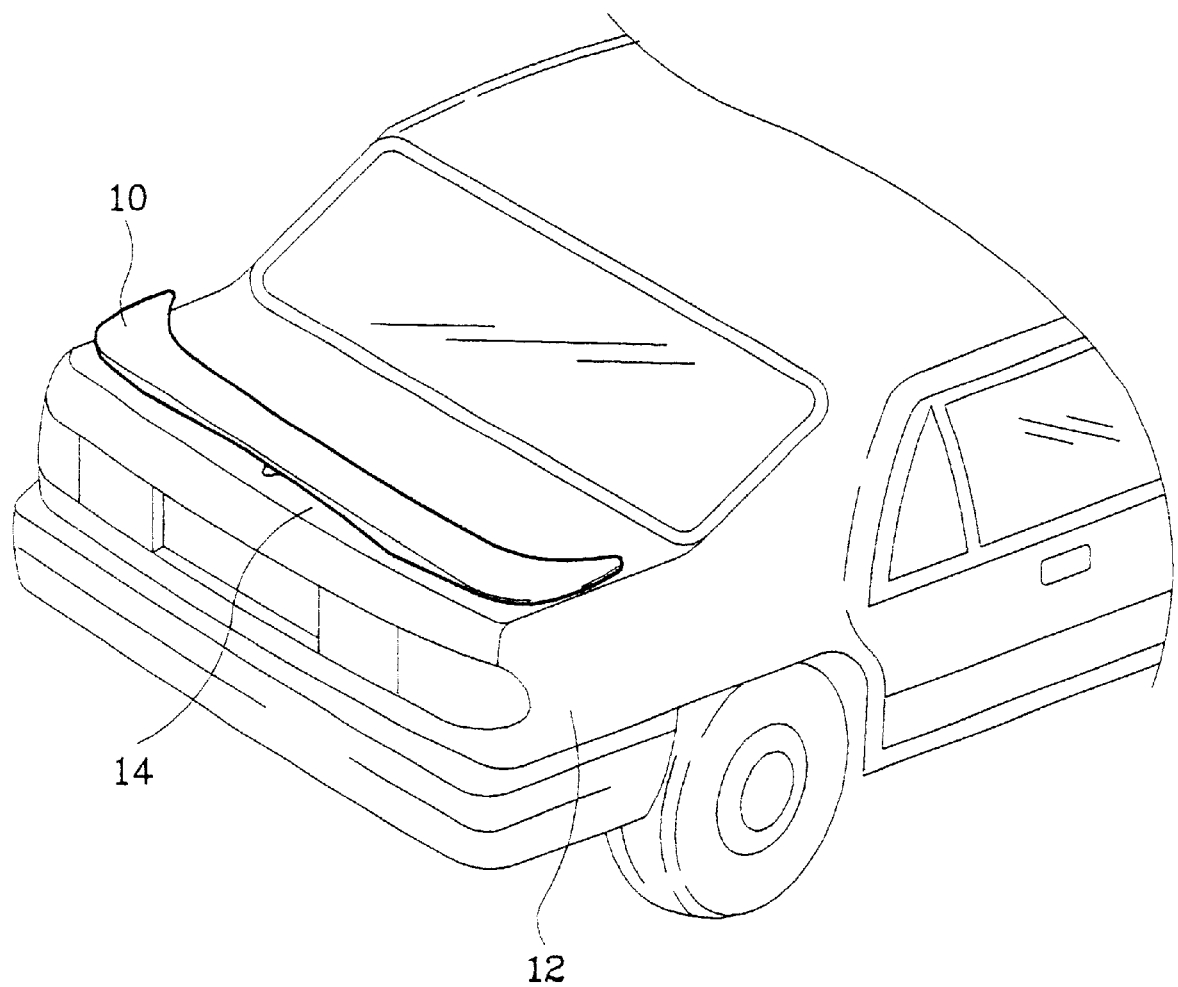
FIG. 1 is a view showing a conventional, prior art air spoiler mounted on the rear side of an automotive vehicle.
Figure 2:
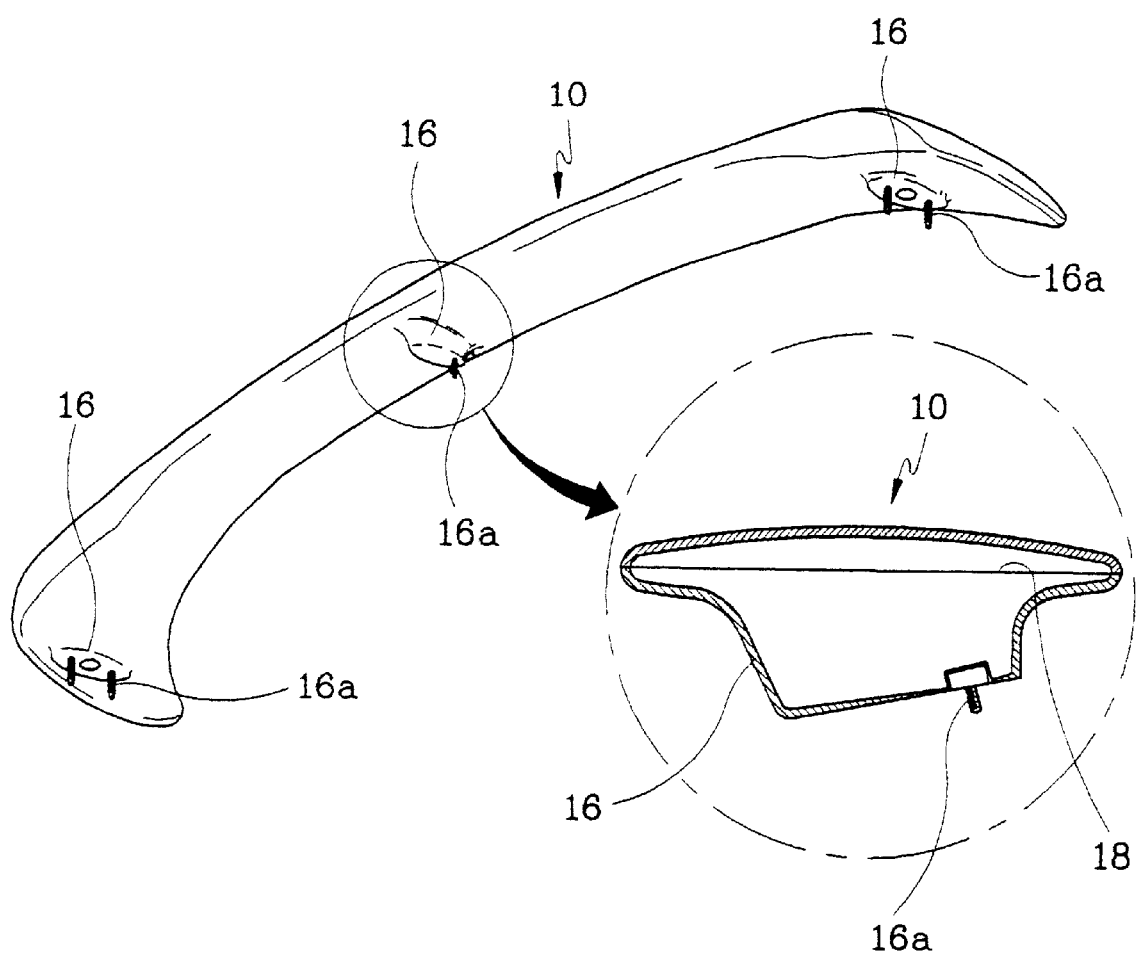
FIG. 2 is a view for explaining the structure of the air spoiler shown in FIG. 1.
Figure 3:
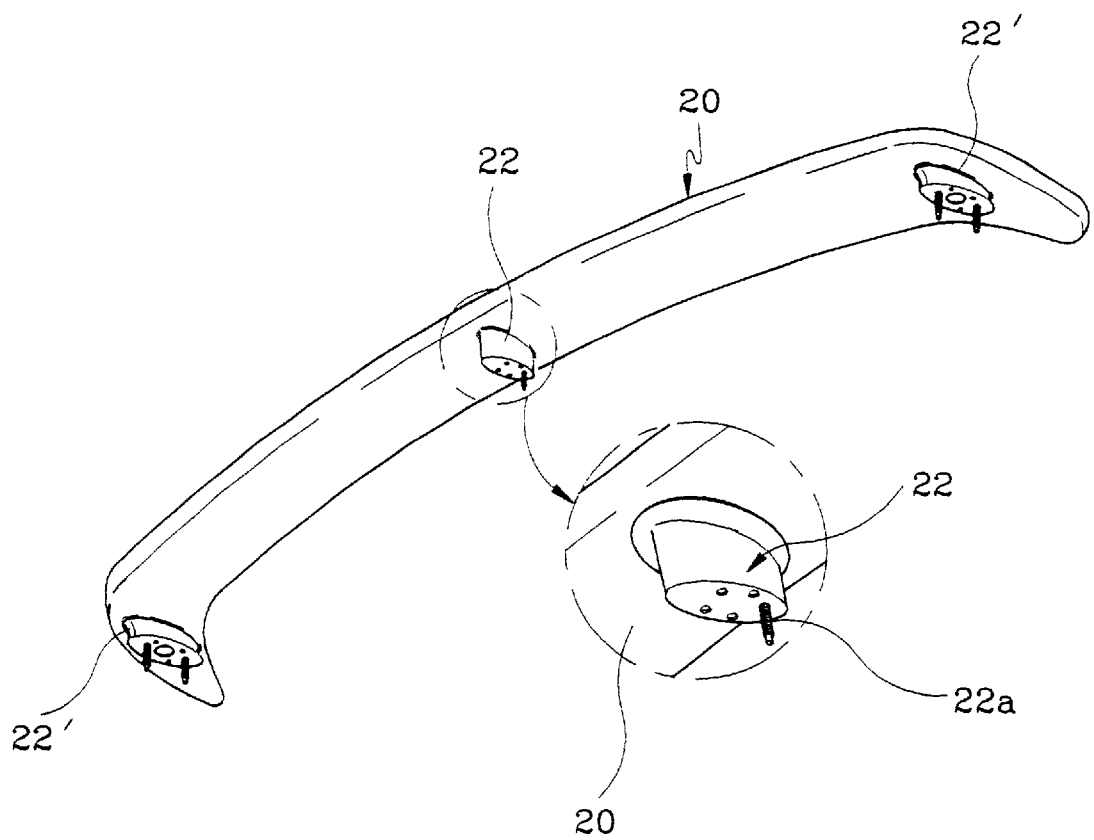
FIG. 3 is a schematic view of an air spoiler for an automotive vehicle according to a preferred embodiment of the present invention.

Referring now to FIG. 3 for explaining an air spoiler for an automotive vehicle in accordance with a preferred embodiment of the present invention, a plurality of reinforcement members 22 are integrally formed on the bottom side of a typical air spoiler 20. The reinforcement members 22 act to space the air spoiler 20 from the upper surface of the trunk lid 14(see FIG. 1) of the automotive vehicle by a predetermined interval. Preferably, each reinforcement member 22 has at least one securement screw 22a, buried thereinto, such as T-bolt for fixing the air spoiler 20 onto the trunk lid of the automotive vehicle. Advantageously, the reinforcement members 22 with the securement device 22a, made of thermoplastic resin, are to be molded integrally with the air spoiler 20 in the core mold and cavity mold during manufacturing the air spoiler 20.

Figure 4A:
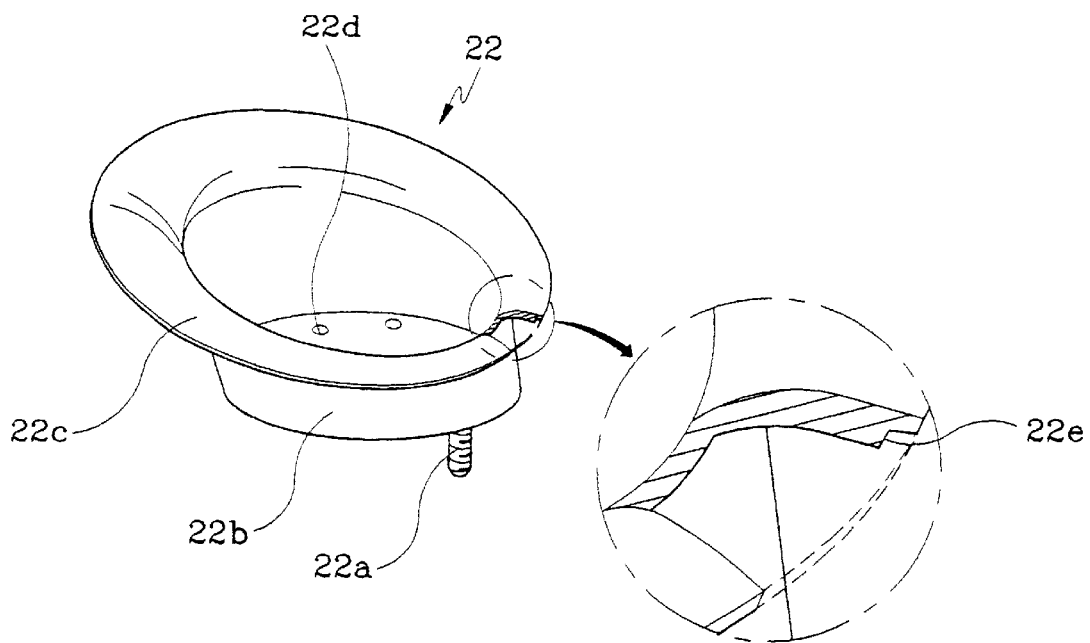
FIGS. 4a and 4b are views showing the preferred examples of a reinforcement member molded in the air spoiler shown in FIG. 3.

As is typically shown in FIG. 4a, the reinforcement member 22 buried in the air spoiler 20 has a main body portion 22b having an elliptic shape in section. The securement screw (that is, T-bolt ) 22a is buried at the bottom side of the main body 22b. Further, the reinforcement member 22 has a flange portion 22c which is outwardly expanded in trumpet shape from the main body portion 22b. That is, the flange portion 22c is engaged to the air spoiler 20 in the core and cavity mold when manufacturing. Besides, a plurality of air-venting apertures 22d are defined at the bottom surface of the main body portion 22b of the reinforcement member 22. When raw material, for example, thermoplastic resin for forming the air spoiler 20 is injected into the main body portion 22b of the reinforcement member 22, the air remaining in the main body portion 22b is exhausted through the air-venting apertures 22d to prevent blowholes which may cause structural vulnerability of the air spoiler 20. In addition, a step-shaped engagement portion 22e is formed at the periphery of the lower side of the flange portion 22c of the reinforcement member 22 in order to assure the increased engagement force of the reinforcement member 22 to the air spoiler 20. Here, the shape of reinforcement member 22 shown in FIG. 4a is designed to fit with the central portion of the air spoiler 20, while the shape of reinforcement member 22' shown in FIG. 4b is suitable to be positioned at the left side of the air spoiler 20 shown in FIG.3.

Similar to the reinforcement member 22 shown in FIG. 4a, the reinforcement member 22' includes a securement screw 22a such as T-bolt to be fixed to the trunk lid 14 (see FIG. 1) of the automotive vehicle, an elliptic main body 22b with air-venting apertures 22d and an outwardly expanded flange portion 22c with a step-shaped engagement portion 22e.

Figure 4B:
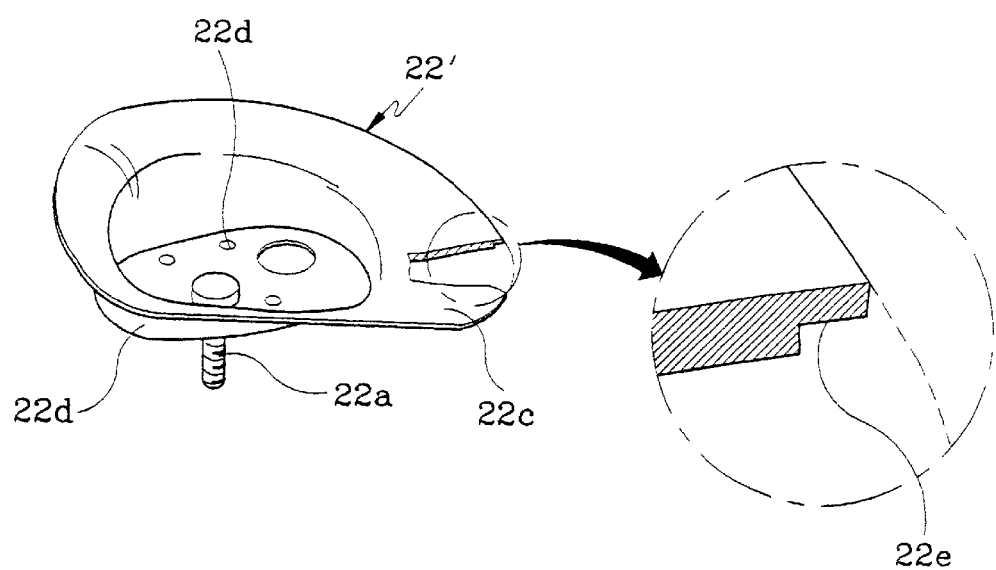

If the reinforcement member 22' shown in FIG. 4b is reversed in shape, it can be attached to the right side of the air spoiler 20 shown in FIG. 3.

According to the present invention, the size and shape of the reinforcement members 22 and 22' shown in FIGS. 4a and 4b can be properly modified in harmony with the design specific of the air spoiler 20.

Figure 5A:
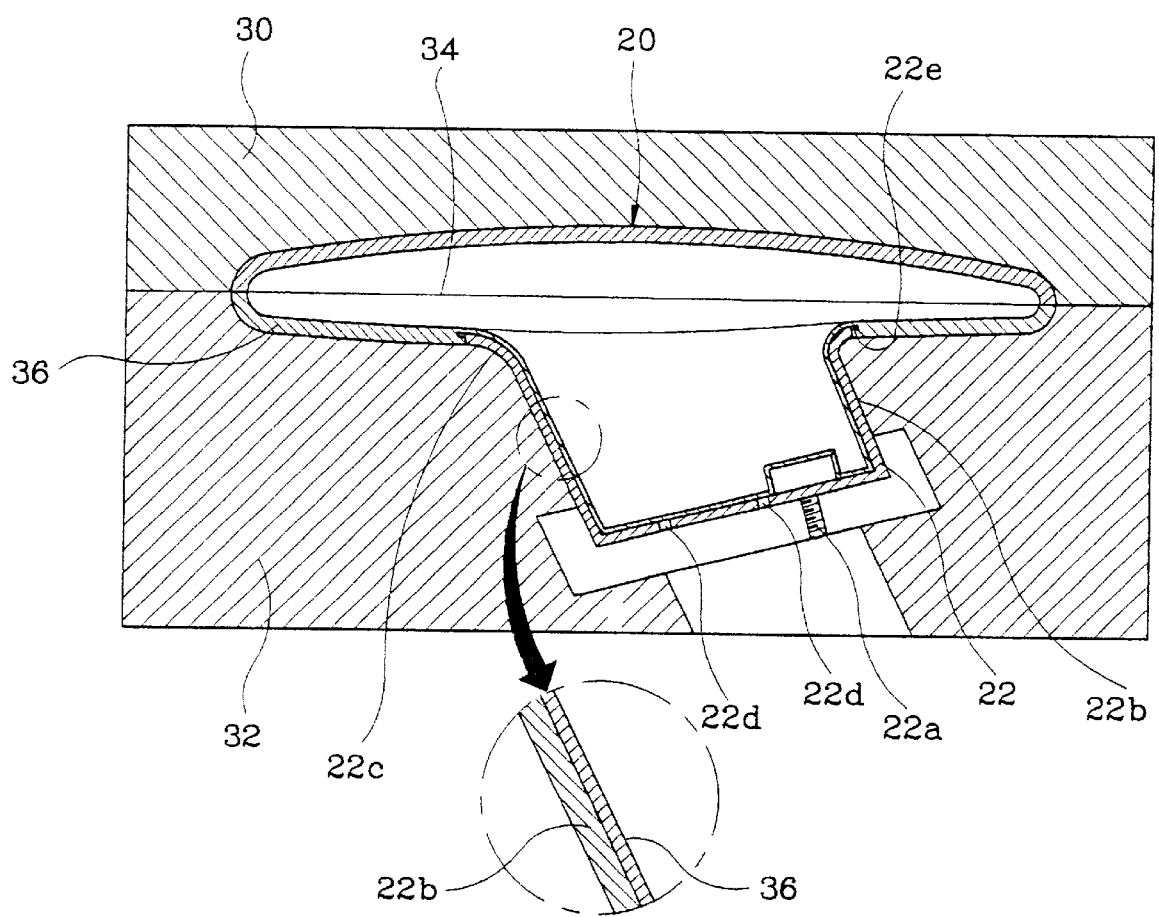
FIG. 5a is a schematic sectional view for explaining a process for manufacturing the air spoiler according to the preferred embodiment of the present invention.

FIG. 5a shows a schematic cross-section view for illustrating a process for manufacturing the air spoiler according to the present invention. Particularly, FIG. 5a illustrates a step of inserting the reinforcement member 22 shown in FIG. 4a into a cavity mold 32, when the air spoiler 20 is formed by injecting raw material into the core mold 30 and the cavity mold 30 mutually opened at present. That is, the raw material, for example, thermoplastic resin is changed in liquid state by passing through a rotary feeding screw from a source tank of the spoiler molding machine. Continuously, the liquidized raw material is changed in cylindrical shape by passing through a head of the spoiler molding machine. Then, the cylindrical raw material is supplied between the core mold 30 and the cavity mold 32 which are mutually opened at present.

In the process for manufacturing the air spoiler for the automotive vehicle according to the present invention shown in FIG. 5a, the core mold 30 is designed to form the upper portion of the air spoiler 20, while the cavity mold 32 is designed to form the lower portion of the air spoiler 20. Here, the reinforcement members 22 and 22' shown in FIGS. 4a and 4b are previously disposed onto the positions of the cavity mold 32 corresponding to the area where the air spoiler 20 is fitted on the trunk lid 14 (see FIG. 1). Then, the cylindrical raw material for forming the air spoiler 20 is supplied between the core mold 30 and the cavity mold 32 which are tightly closed centering around a mold mating surface 34. And an air cylinder of the spoiler molding machine is advanced to make a predetermined number of air-blowing holes through the raw material for forming the air spoiler 20 by means of a plurality of blow pins of the air cylinder. Accordingly, an air-blowing process for obtaining a first stage product of the air spoiler 20 is executed through the air-blowing holes in the core and cavity molds 30 and 32. At this time, the raw material is engaged to the engagement portion 22e of the flange portion 22c of the reinforcement member 22 and, simultaneously, injected into the main body portion 22b of the reinforcement member 22.

Meanwhile, when the raw material for forming the air spoiler 20 is being injected into the main body portion 22b during the air-blowing stage, if any air remains in the main body portion 22b of the reinforcement member 22, undesired blowholes may be made at the surface of the air spoiler product, thus deteriorating the resin engaging force of the reinforcement member 22 and causing structural vulnerability of the air spoiler 20 consequently. However, according to the present invention, air remaining in the reinforcement member 22 can be exhausted through the air venting apertures 22d formed at the bottom surface of the main body portion 22b of the reinforcement member 22, thus securely injecting the raw material for forming the air spoiler 20 into the interior of the reinforcement member 22. After the air-blowing stage, the air cylinder returns to the original position and the core and cavity molds 30 and 32 open slowly. Accordingly, the first stage product 36 of the air spoiler 20 is taken out from the core and cavity molds 30 and 32 and subjected to remove undesirable refuses, such as burr, thus completing the process for manufacturing the air spoiler according to the present invention. In the air spoiler 20 obtained in accordance with the process of the present invention, the reinforcement members are firstly disposed onto the positions of the cavity mold corresponding to the area where the air spoiler 20 is fitted to the trunk lid of the automotive vehicle and, then, the raw material for forming the air spoiler is subsequently injected into the mutually closed core and cavity molds as well as the interior of the reinforcement members 22, thus forming the first stage air spoiler 20 having the reinforcement members 22 integrally. Accordingly, even if the raw material for forming the air spoiler 20 is irregularly injected to the inside of the reinforcement member 22, the durability of reinforcement members 22 to be fitted to the air spoiler 20 can be satisfactorily assured.

Figure 5B:
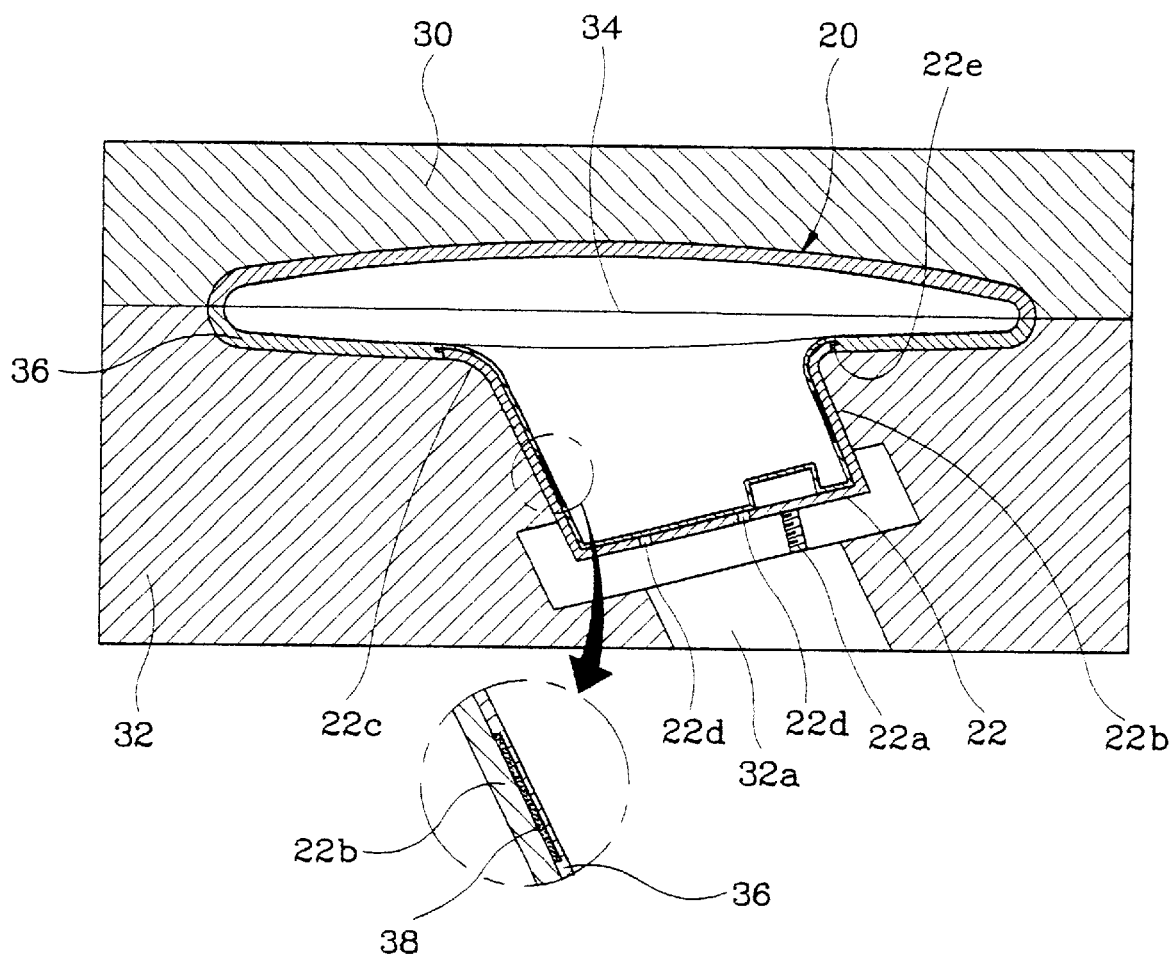
FIG. 5b is a schematic sectional view for explaining a process of the air spoiler according to another embodiment of the present invention; and, FIGS. 6a to 6d are views showing modified examples of the reinforcement member according to the present invention.

Referring to FIG. 5b showing a modified process for manufacturing an air spoiler for an automotive vehicle according to the present invention, an engagement reinforcing means for enhancing the resin-engaged force is provided inside the reinforcement member 22. Preferably, an example of the engagement reinforcing means is an adhesive tape 38 which is adhered in ring-shape on the inner wall of the main body portion 22b of the reinforcement member 22. In this case, adhesive agent coated on the tape 38 is melted by the heat of the raw material passed through the head of the spoiler molding machine, thus enhancing the resin-engaged force of the air spoiler 20 and the reinforcement member 22 remarkably. Alternatively, another example of the engagement reinforcing means is a predetermined plastic primer which also assures satisfactory resin-engaged force of the reinforcement member 22 to the air spoiler 20.

FIGS. 6a to 6d show modified examples of the engagement portion 22e formed at the periphery of the flange portion 22c of the reinforcement member 22.

Figure 6A:
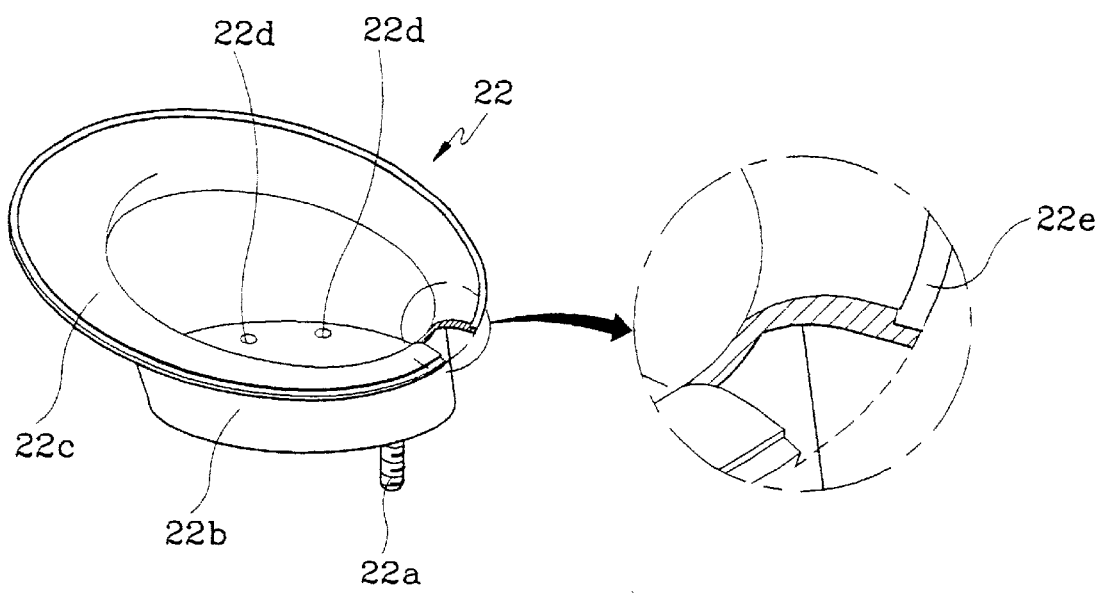
Figure 6B:
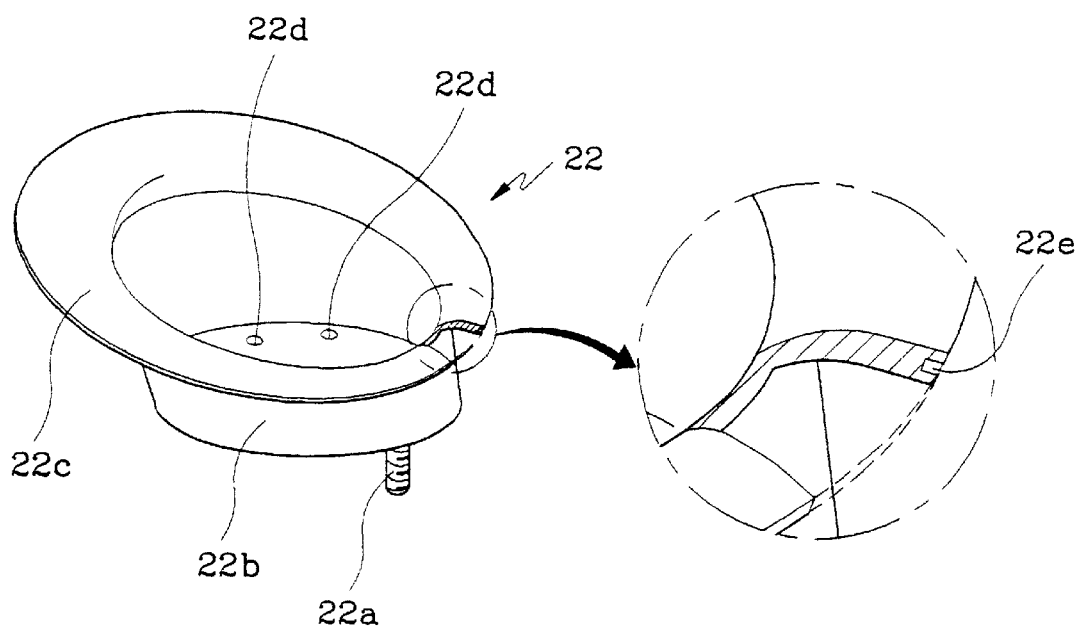

Referring firstly to FIG. 6a, the engagement portion 22e is formed at the periphery of the upside surface of the flange portion 22c of the reinforcement member 22. In FIG. 6b, the engagement portion 22e formed at the flange portion 22c of the reinforcement member 22 is defined in '⊏' shape.

Figure 6C:
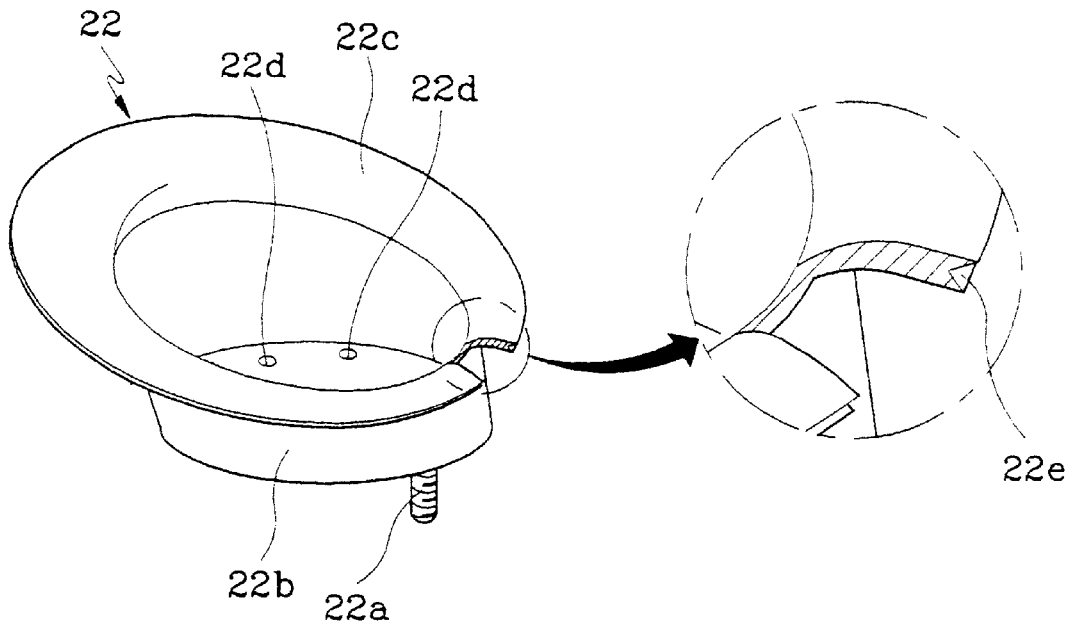
Figure 6D:
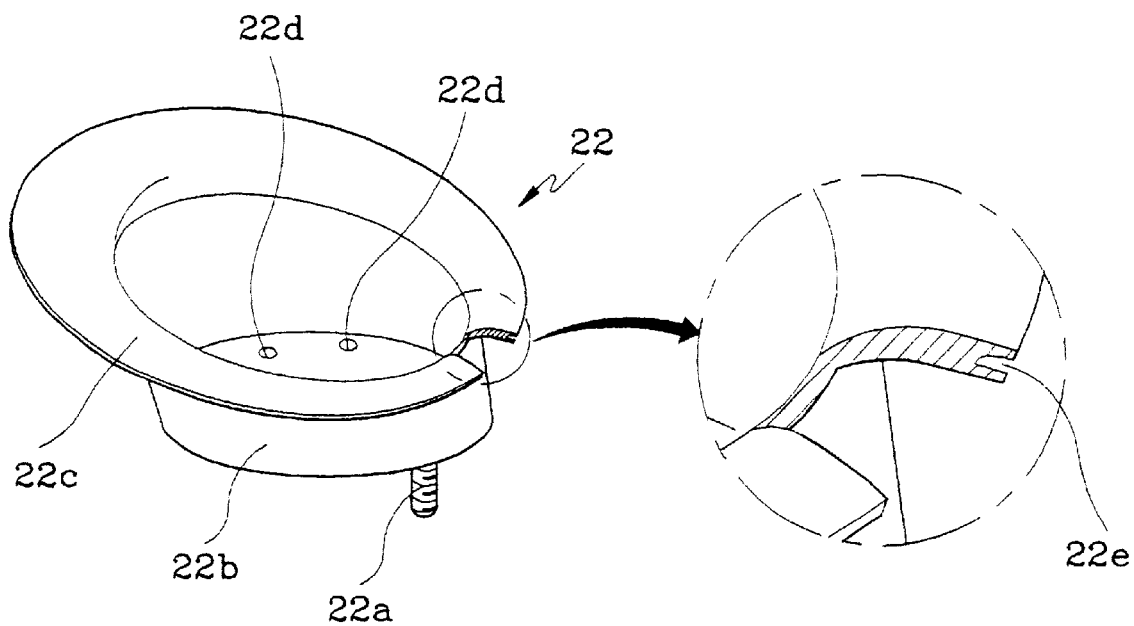

Alternatively, referring to FIG. 6c, the engagement portion 22e is defined in 'V' shape. The engagement portion 22e shown in FIG. 6d is defined in ' ⊂ ' shape.

Here, the above described reinforcement members 22 having various engagement portions 22e shown in FIGS. 6a to 6d applied to the air spoiler assure the same effect with each other.

As described above in accordance with the preferred embodiments of the present invention, since separate reinforcement members are integrally molded around the area where the air spoiler is fitted to the trunk lid of the automotive vehicle, it can prevent any disadvantage may occur due to the irregular injection in thickness of the raw material. Also, the limitation on the design of the air spoiler can be also relaxed because the size and the shape of the reinforcement member can be varied depending on the specific of the air spoiler designed.

Although the invention has been specifically described with respect to several embodiments, it is understood that the invention is not limited thereto but is susceptible of various changes and modifications as known to those skilled in the art without departing from the scope and spirit of the invention.

What is claimed is:

1. An air spoiler fitted onto the rear side surface of an automotive vehicle, comprising:

a plurality of reinforcement means integrally molded with said air spoiler, said reinforcement means being molded around an area where said air spoiler is fitted onto the rear side surface of the vehicle, each of said reinforcement means having a main body portion with at least one securement screw for fitting onto the rear side surface of the vehicle and a trumpet-shaped flange portion outwardly expanded from said main body portion, wherein an engagement portion is formed at a periphery of said flange portion of said reinforcement means and said engagement portion being provided for integrally molding said reinforcement means with said air spoiler.

2. An air spoiler fitted on the rear side of an automotive vehicle, comprising:

a plurality of reinforcement means integrally molded with the air spoiler, said reinforcement means being molded at positions where the air spoiler is fitted on the rear side surface of said vehicle, said reinforcement means having an engagement portion for integrally engaging to the air spoiler; and, engagement reinforcing means for enhancing resin engaged force of said reinforcement member to the air spoiler, wherein an adhesive tape or a predetermined plastic primer is used as said engagement reinforcing means, and wherein said adhesive tape being adhered in ring-shape on an inner wall surface of main body portion of said reinforcement means, and said predetermined plastic primer being inserted to inside of said main body portion of said reinforcement means.

3. An air spoiler fitted onto a rear side surface of an automotive vehicle by means of a plurality of reinforcement members, wherein improvement comprising: a plurality of openings on a bottom side surface of said air spoiler; said reinforcement member having a main body portion with at least one securement screw for fitting into the rear side surface of the vehicle, openings in a bottom surface of said reinforcement member, and a trumpet-shaped flange portion outwardly expanded from said main body portion; and wherein said flange portion being engaged to a respective opening of said air spoiler, so that during integral manufacturer of said air spoiler and said reinforcement member thermal plastic resin may be injected inside of said reinforcement member.

4. The air spoiler for an automotive vehicle according to claim 3, wherein an engagement reinforcing means is further provided at the inside of said reinforcement means for enhancing resin-engaged force of said air spoiler to said reinforcement member.

5. An air spoiler fitted onto a rear side surface of an automotive vehicle by means of a plurality of reinforcement members, wherein improvement comprises:

a plurality of openings on a bottom side surface of said air spoiler; said reinforcement members having main body portion with openings in a bottom surface thereof and with at least one securement screw for fitting onto the rear side surface of the vehicle, a trumpet-shape flange portion outwardly expanded from said main body portion, and an engagement portion for integrally engaging to the air spoiler;

engagement reinforcement means for enhancing resin engaged force of said reinforcement member to the air spoiler;

said engagement portion being engaged into a respective opening of said air spoiler and during the manufacture of the integrally made air spoiler and reinforcement member thermal plastic resin being injected inside said reinforcement member.

6. The air spoiler for the automotive vehicle according to claim 5, wherein each of said reinforcement means has the main body portion with at least a securement screw for fitting onto the rear side surface of the vehicle.

* * * * *